US007242486B2

(12) United States Patent
Jespersen et al.

(10) Patent No.: US 7,242,486 B2
(45) Date of Patent: Jul. 10, 2007

(54) NOTE SKEW DETECTOR

(75) Inventors: Gunnar Jespersen, Aberdeen (GB); Eric G. Lyons, Dundee (GB)

(73) Assignee: NCR Corporation, Dayton, OH (US)

( * ) Notice: Subject to any disclaimer, the term of this patent is extended or adjusted under 35 U.S.C. 154(b) by 288 days.

(21) Appl. No.: 10/922,524

(22) Filed: Aug. 20, 2004

(65) Prior Publication Data

US 2005/0041240 A1 Feb. 24, 2005

(30) Foreign Application Priority Data

Aug. 23, 2003 (GB) ................................ 0319882.7

(51) Int. Cl.
*G01B 11/26* (2006.01)
*G01B 11/14* (2006.01)
*G01N 21/86* (2006.01)

(52) U.S. Cl. ................................ 356/614; 250/559.12

(58) Field of Classification Search .................. 33/286; 356/620, 621, 614; 250/559.12
See application file for complete search history.

(56) References Cited

U.S. PATENT DOCUMENTS 4,106,667 A * 8/1978 Lynott ........................... 221/1
4,559,451 A 12/1985 Curl
6,568,591 B2 * 5/2003 Modi ......................... 235/379
7,049,572 B2 * 5/2006 Jespersen et al. ........... 250/205
7,194,151 B2 * 3/2007 Tennant et al. ............... 385/12
2005/0087422 A1 * 4/2005 Maier et al. ................ 194/207
2006/0115138 A1 * 6/2006 Klock et al. ................ 382/135
2006/0289813 A1 * 12/2006 Jeong et al. ........... 250/559.36

FOREIGN PATENT DOCUMENTS

EP 0 881 604 A1 12/1998
EP 1 248 224 A2 10/2002
JP 56022903 A 8/1979
JP 56022903 A * 3/1981
JP 62159007 A 1/1986
JP 9089538 A 9/1995
JP 09089538 A * 4/1997

OTHER PUBLICATIONS

JP 09089538 A, Machine Translation of, from JPO, http:// www4.ipdl.ncipi.go.jp/Tokujitu/PAJdetail.ipdl?N0000=60&N0120=01&N2001=2&N3001=H09-089538.*
JP 56022903 A, "Abstact" and "Constitution" translation in EAST. from JPO.*

* cited by examiner

*Primary Examiner*—Gregory J. Toatley, Jr.
*Assistant Examiner*—Bryan Giglio
(74) *Attorney, Agent, or Firm*—Michael Chan

(57) ABSTRACT

A note skew detector, for use in a note transport mechanism of an Automated teller Machine (ATM) is described. The detector comprises a light source and a single optical sensor, optically coupled via a pair of optical wave-guides arranged to have an air gap there between so as to provide a note transport path between the said wave-guides. The wave-guides are further arranged to provide a first optical path and a second, distinct, optical path between said light source and said sensor.

9 Claims, 3 Drawing Sheets

SENSOR OUTPUT
50%
NOTE POSITION
A
B
1

SENSOR OUTPUT
100%
NOTE POSITION
A
B
2

SENSOR OUTPUT
100%
NOTE POSITION
A
B
3

SENSOR OUTPUT
NOTE POSITION
A
B
4

SENSOR OUTPUT
NOTE POSITION
A
B
5

SENSOR OUTPUT
NOTE POSITION
H
G
y
x
A
B
6

NOTE SKEW DETECTOR

BACKGROUND OF THE INVENTION

The present invention relates generally to a note skew detector.

A detector in accordance with the present invention has application, for example, to the detection of skewed bank noted in the transport path of an Automated Teller Machine (ATM). In the cash dispensing mechanism of the aforementioned ATM it is important to provide a simple and reliable means for detecting skewed notes. Notes can become skewed as they are transported from a note storage cassette to the output slot of the ATM, as can notes deposited by a user and it is equally important to detect skew in notes being deposited in the ATM.

A variety of different prior art detectors have been utilized to detect note skew in ATMs. These include both electro-mechanical and optical detectors. However, they all have certain features in common. In particular, they all rely on a pair of sensors, each of which is located at a predetermined position along the transport path within the ATM. Also as the detector is arranged to determine skew perpendicular to the direction of travel along the transport path, both the sensors and light sources must be located within the transport path, thus making assembly and serviceability of the detectors difficult. For example, cables must be laid into both sides of the transport path to connect to the sensors.

SUMMARY OF THE INVENTION

It is an object of the present invention to produce an improved note skew detector.

According to a first aspect of the present invention there is provided a note skew detector for use in a note transport mechanism, the detector comprising a light source and an optical sensor, which are optically coupled via two distinct optical paths which are formed in part by optical light guides.

Preferably, the optical sensor is a single optical sensor and the light-guides are optical wave-guides.

More preferably, the detector further comprises a control means arranged to make determinations as to the degree of skew of a note based on the signal produced from the sensor.

More preferably, the detector, when in use, is arranged such that the sensor receives light via each optical path, the output of the sensor being dependent on whether or not a note is present in either or both optical paths.

According to a second aspect of the present invention there is provided a note skew detector, for use in a note transport mechanism of an Automated Teller Machine (ATM) the detector comprising a light source and a single optical sensor, optically coupled via two pairs of optical wave-guides each pair being arranged to have an air gap there between so as to provide a note transport path between the said wave-guides, the wave-guide pairs being further arranged to provide a first optical path and a second, distinct, optical path between said light source and said sensor.

According to a third aspect of the present invention there is provided a method of detecting skew in a bank note, being transported along the transport path of a note transport mechanism, utilizing a note skew detector comprising a light source and an optical sensor, which are optically coupled via light guides arranged to transmit light from the source to the sensor via two distinct optical paths, the method comprising detecting an output at the sensor based on light transmitted via both the first and second optical paths.

According to a fourth aspect of the present invention there is provided an Automated Teller Machine (ATM) having a note skew detector as described above, wherein the light source and sensor are located outside of the note transport path of the ATM.

BRIEF DESCRIPTION OF THE DRAWINGS

An embodiment of the present invention will now be described, by way of example, with reference to the accompanying drawings, in which.

DETAILED DESCRIPTION

Figure 1:
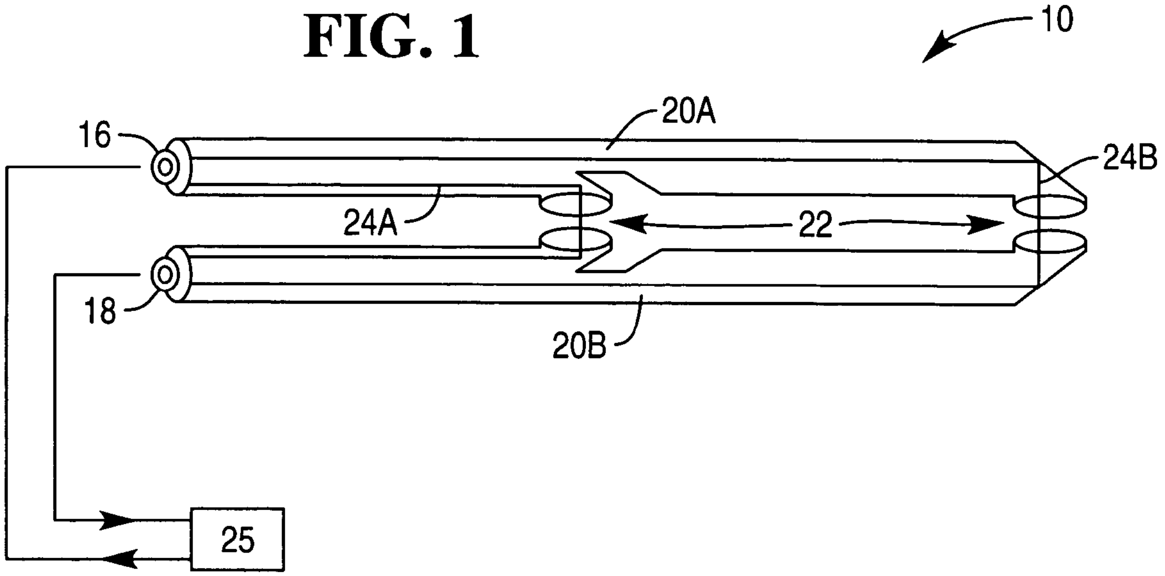
FIG. 1; is a schematic illustration of a note skew detector in accordance with the present invention.

FIG. 1 illustrates a skew note detector 10, including an optical sensing means 12, for use in a note transport mechanism 14 of an Automated teller Machine (ATM) (not shown). The detector 10 comprises a light source 16 and a single optical sensor 18, optically coupled via a pair of optical wave-guides 20A, 20B. The light source 16 may comprise a Light Emitting Diode (LED). The wave-guides are arranged to have an air gap 22 there between, so as to provide a note transport path between the said wave-guides. The wave-guides are further arranged to provide a first optical path 24A and a second, distinct, optical path 24B between the light source 16 and the sensor 18. In this way the output of the sensor 18 is dependent on the light transmitted via the wave-guides 20A, 20B to the sensor 18, over both optical paths 24A, 24B. The output of the sensor 18 is fed to a control means 25 arranged to make determinations as to the degree of skew of a note based on the output of the sensor 18, as will be discussed in more detail below, with reference to FIGS. 2 & 3.

Figure 2:
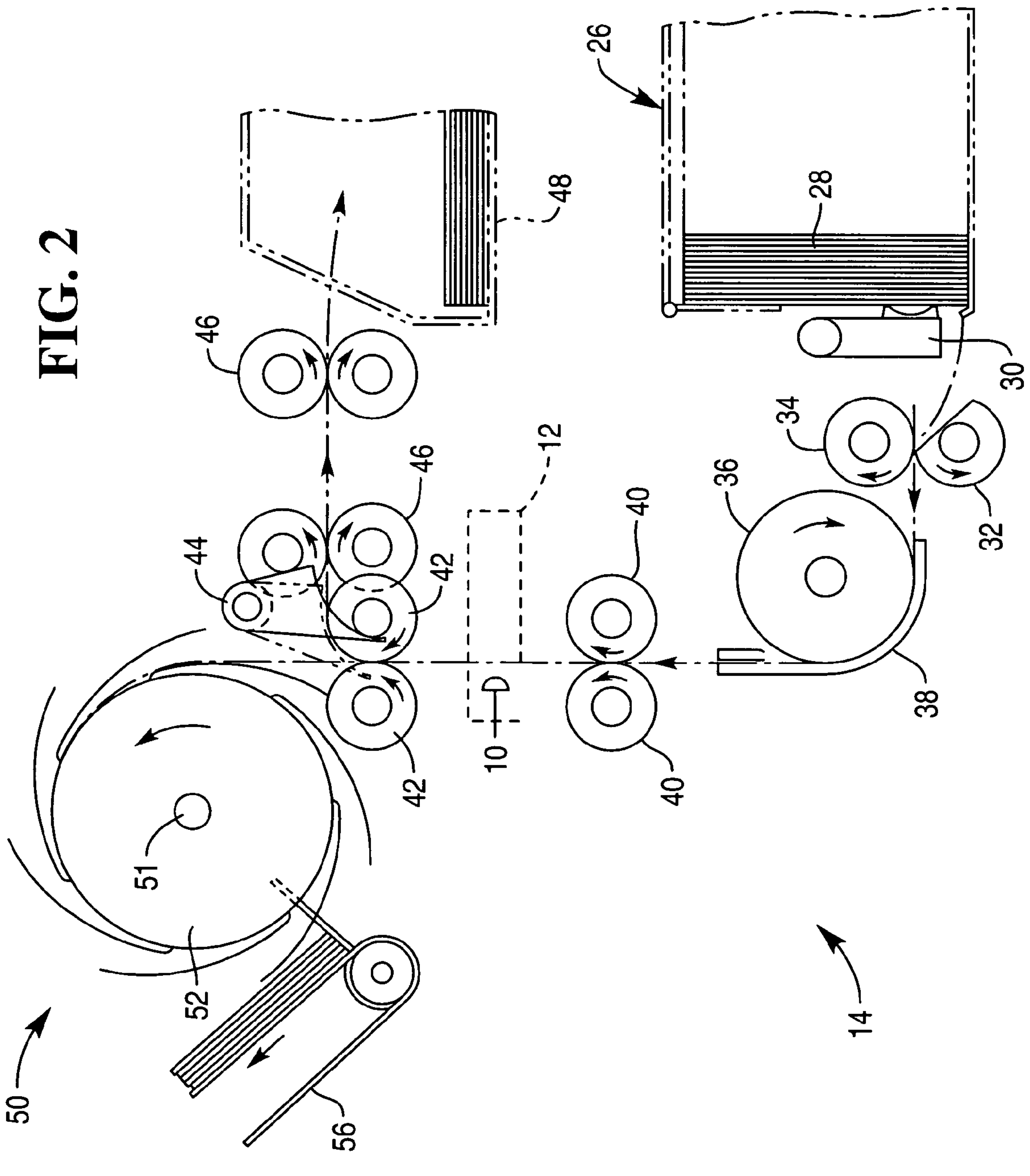
FIG. 2 is a schematic illustration of an Automated Teller Machine (ATM) in accordance with the present invention.

FIG. 2 illustrates the use of the detector 10 in the transport mechanism 14. In addition it illustrates the flexibility of the detector which, in addition to note skew detection can also provide information on double picked notes. The cash transport mechanism of FIG. 2 is part of an ATM cash dispensing mechanism, comprising a currency cassette 26 arranged to contain a stack of currency notes 28 of the same pre-determined denomination supported on their long edges. The cassette 26 is associated with a pick mechanism 30. When one or more currency notes are to be dispensed from the cassette 26 in the course of a cash dispensing operation, the pick mechanism 30 draws out notes one by one from the stack 28, and each note is fed by feed rollers 32,34,36 via guide means 38 to feed rollers 40. The direction of feed of the notes is at right angles to their long dimensions. It should be understood that the cash dispensing mechanism 14 could include more than one cassette each associated with a pick mechanism, but in the present embodiment only one cassette and pick mechanism will be described.

Each picked note is passed through the sensing station 12 by the feed rollers 40 and by further feed rollers 42. If a multiple note is detected by the optical system 10, in a manner to be described in more detail below, then a divert gate 44 diverts the multiple note via rollers 46 into a reject bin 48, in a manner known to a skilled person.

If a single note is detected then the note passes on to a stacking wheel 50 to be loaded on to stationary belt means 56. The stacking wheel 50 comprises a plurality of stacking plates 52 spaced apart in parallel relationship along the shaft 51 of the stacking wheel 50. When the required number of notes have been loaded on to the belt means 56, the belt means 56 transports the notes to a cash delivery slot (not shown), again in a manner known to a skilled person, which will not therefore be described further herein.

The detector 10 is positioned within the transport mechanism 14, such that the first and second wave-guides 20A, 20B lie on opposite sides of the transport path. Thus one or more bank notes being transported by the mechanism will pass through the air gap 22 between the wave-guides 20A, 20B. As the source 16 and sensor 18 are arranged at the same side of the transport path all necessary wiring can be located at the one side making assembly and repair considerably easier than in prior art detectors. Hence there is no need to feed wiring into the body of the transport mechanism, as with prior art skew and double pick detectors.

FIGS. 3A to 3F illustrate, the output of the sensor 18 as a skewed note passes through the air gap 22 in the detector 10. A reader may find it more intuitive for the blocking of one optical path (by a bank note) to result in a 50% reduction in the signal from the sensor, as 50% of the light is being blocked. However, a 50% increase is read here only due to an inversion at the detector, as selected by the inventors. The signals illustrated in FIGS. 3A to 3F could be inverted and the system would still function normally.

Figures 3A, 3B, 3C, 3D, 3E, 3F:
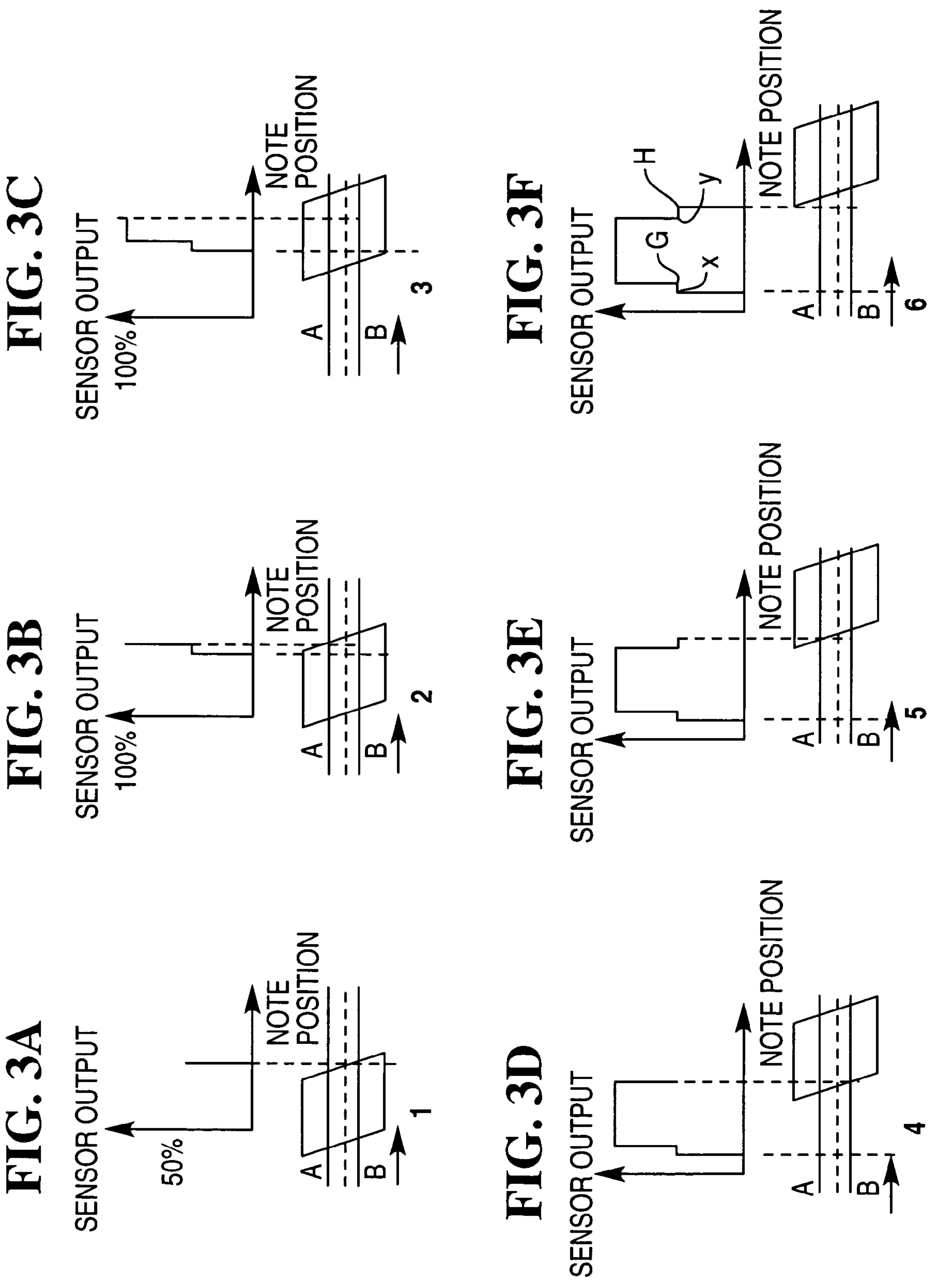
FIGS. 3A to 3F graphically illustrate the output of a detector in accordance with the present invention, during the detection of a skewed bank note.

At point 1) of FIG. 3A a portion of a skewed note covers sensor position B resulting in a 50% sensor output signal.

At point 2), FIG. 3B, the note has moved forward and now covers beam position A as well as position B resulting in a 100% sensor output signal. The interval between the two positions, seen as a flat horizontal line in FIG. 3B, is representative of the skew of the note. The longer the flat horizontal line the greater the note skew.

As seen in FIG. 3C, the skewed note proceeds until, as seen in FIG. 3.D, the trailing edge of the note passes out of the optical path of the detector at point A. At this point, as seen in FIG. 3D, the sensor output again falls to 50%. FIG. 3E illustrates the 50% output from the sensor because once again only one optical path (that at A) is blocked by the note, until that portion of the note also passes out of the optical path and the output falls to 0, as seen in FIG. 3F. The skewed note has left the beam A.

The skew detected at the leading edge and the trailing edge can now be compared for enhanced note information. In other words, the flat lines at 50% intensity at the beginning and the end of FIG. 3F can be measured to determine the degree of skew. Also, the distances from X to Y and G to H can each be measured to determine the width of the note.

Modifications may be incorporated without departing from the scope of the present invention.

The term “note” as used throughout the description and claims is intended to mean any media or other sheet material, suitable for transportation along a transport path and subject to skewing during transportation.

What is claimed is:

1. A note skew detector for use in a note transport mechanism having a note transport path lying in a first plane which is substantially parallel to a second plane and a third plane and which is located between the second and third planes, the detector comprising:

a light source lying in the second plane;

an optical sensor lying in the third plane; and optical light guides which form, at least in part, two distinct optical paths which optically couple the light source and the optical sensor;.

wherein the light source is located on one side of the note transport path and the optical sensor is located on the same side of the note transport path.

2. A detector as claimed in claim 1, further comprising control means for determining degree of skew of a note based upon an output signal from the optical sensor.

3. A detector as claimed in claim 2, wherein (i) the optical sensor receives light via each optical path, and (ii) the output signal of the optical sensor is dependent on whether or not a note is present in either one optical path or both optical paths.

4. A detector as claimed in claim 2, wherein the control means includes means for providing double pick information.

5. A detector as claimed in claim 1, wherein the light source comprises a Light Emitting Diode (LED).

6. A note skew detector for use in a note transport mechanism having a note transport path lying in a first plane which is substantially parallel to a second plane and a third plane and which is located between the second and third planes, the detector comprising:

a light source lying in the second plane;

an optical sensor lying in the third plane; and two pairs of optical wave-guides which provide a first optical path and a second, distinct, optical path between the light source and the optical sensor, each pair of guides having an air gap therebetween so as to provide the note transport path between the wave-guide pairs;

wherein the light source is located on one side of the note transport path and the optical sensor is located on the same side of the note transport path.

7. An Automated Teller Machine (ATM) having a note skew detector, the ATM comprising:

a note transport path lying in a first plane which is substantially parallel to a second plane and a third plane and which is located between the second and third planes;

a light source located outside of the note transport path and lying in the second plane;

a single optical detector located outside of the transport path and lying in the third plane;

a first optical light guide defining a first optical path which extends between the light source and the single optical detector and which passes through a first portion of the note transport path;

a second optical light guide defining a second optical path which is different from the first optical path and which extends between the light source and the single optical detector and which passes through a second portion of the note transport path which is different from the first portion of the note transport path;

wherein (i) the first optical light guide includes a pair of optical wave-guides having an air gap therebetween such that the first optical path extends through the air gap when the first optical path passes through first portion of the note transport path and (ii) the second optical light guide includes a pair of optical wave-guides having an air gap therebetween such that the second optical path extends through the air gap when the second optical path passes through second portion of the note transport path;

wherein the light source and the single optical detector are located on the same side of the note transport path.

8. An ATM as claimed in claim 7, wherein the light source is located outside of a media transport.

9. A method of detecting skew in a bank note which is being transported along a note transport path lying in a first plane which is substantially parallel to a second plane and a third plane and which is located between the second and third planes, the method comprising:

detecting light which is being transmitted along a first optical light path from a light source which lies in the second plane, the first optical light path forming a substantially U-shaped path in which one leg portion of the U-shaped path lies in the second plane and the other leg portion of the U-shaped path lies in the third plane;

detecting light which is being transmitted along a second optical light path which is different from the first optical light path from the light source, the second optical light path forming a substantially U-shaped path in which one leg portion of the U-shaped path lies in the second plane and the other leg portion of the U-shaped path lies in the third plane; and producing a signal which varies as a function of the light detected along the first optical light path and the light detected along the second optical light path to provide an indication of the degree of skew of a bank note which is being transported along the note transport path.

* * * * *